(12) United States Patent
Li et al.

(10) Patent No.: US 11,026,319 B2
(45) Date of Patent: Jun. 1, 2021

(54) MULTI-OUTPUT HIGH-VOLTAGE POWER SUPPLY AND DISTRIBUTED RAY SOURCE WITH MULTI-OUTPUT HIGH-VOLTAGE POWER SUPPLY

(71) Applicants: Tsinghua University, Beijing (CN); NUCTECH COMPANY LIMITED, Beijing (CN); NuRay Technology Co., Ltd, Jiangsu (CN)

(72) Inventors: Yuanjing Li, Beijing (CN); Yaohong Liu, Beijing (CN); Huaping Tang, Beijing (CN); Jinsheng Liu, Beijing (CN); Xiying Liu, Beijing (CN); Zhanfeng Qin, Beijing (CN); Wei Jia, Beijing (CN); Jinsong Pan, Beijing (CN)

(73) Assignees: Tsinghua University, Beijing (CN); NUCTECH COMPANY LIMITED, Beijing (CN); NuRay Technology Co., Ltd, Jiangsu (CN)

( * ) Notice: Subject to any disclaimer, the term of this patent is extended or adjusted under 35 U.S.C. 154(b) by 0 days.

(21) Appl. No.: 16/727,639

(22) Filed: Dec. 26, 2019

(65) Prior Publication Data
US 2020/0253033 A1    Aug. 6, 2020

(30) Foreign Application Priority Data
Dec. 28, 2018   (CN) .......................... 201811632243.1

(51) Int. Cl.
| | |
|---|---|
| *H05G 1/32* | (2006.01) |
| *H02M 3/28* | (2006.01) |
| *H02M 7/10* | (2006.01) |
| *H05G 1/20* | (2006.01) |
| *H05G 2/00* | (2006.01) |

(52) U.S. Cl.
CPC ................ *H05G 1/32* (2013.01); *H02M 3/28* (2013.01); *H02M 7/10* (2013.01); *H05G 1/20* (2013.01); *H05G 2/00* (2013.01)

(58) Field of Classification Search
CPC .. H05G 1/32; H05G 1/20; H05G 1/12; H05G 1/70; H02M 3/28; H02M 7/10; H02M 3/00; H02M 2001/0045; H02M 2001/0077; H02M 2001/0067; H02M 2001/0083
See application file for complete search history.

(56) References Cited

U.S. PATENT DOCUMENTS

| | | | | | |
|---|---|---|---|---|---|
| 2,569,945 | A | * | 10/1951 | Olav ......................... | H05G 1/32 323/291 |
| 4,013,936 | A | * | 3/1977 | Hesler ...................... | H05G 1/32 363/25 |
| 4,238,681 | A | * | 12/1980 | Seissl ........................ | G05F 1/30 378/105 |

* cited by examiner

*Primary Examiner* — Christine S. Kim
(74) *Attorney, Agent, or Firm* — Merchant & Gould P.C.

(57) ABSTRACT

Embodiments of the present disclosure disclose a multi-output high-voltage power supply including a channel selection circuit (103) including a plurality of switches; and a high-voltage power supply module (101) connected to the channel selection circuit (103), wherein the high-voltage power supply module (101) includes a fine adjusting power supply component (110) and a plurality of coarse adjusting power supply components (120-1 to 120-N) connected in series, wherein one high-voltage output terminal of the high-voltage power supply module (101) is connected to a common terminal of the channel selection circuit (103), and the other high-voltage output terminal of the high-voltage power supply module (101) is grounded through a current sampling resistor.

11 Claims, 1 Drawing Sheet

MULTI-OUTPUT HIGH-VOLTAGE POWER SUPPLY AND DISTRIBUTED RAY SOURCE WITH MULTI-OUTPUT HIGH-VOLTAGE POWER SUPPLY

CROSS-REFERENCE TO RELATED APPLICATION

This application claims benefit of Serial No. 201811632243.1, filed 28 Dec. 2018 in China, and which application is incorporated herein by reference. A claim of priority is made to the above-disclosed application.

TECHNICAL FIELD

The present disclosure relates to the field of high-voltage power supplies, and more particularly, to a multi-output high-voltage power supply based on a direct current-isolated power supply module and a distributed ray source with a multi-output high-voltage power supply.

BACKGROUND

Existing high-voltage power supplies are usually single-output power supplies for a single load, and it usually takes a long time to adjust output voltages thereof, for example, on an order of milliseconds or even seconds. In some application scenarios, such a single-output power supply may not meet requirements. For example, a distributed X-ray source with multiple cathodes (such as the distributed X-ray source developed by XinHong Electronics Co., Ltd.) allows only one cathode to be in an operating state at a certain time, and the cathodes may have different operating current and operating time. The shortest switching time between the cathodes is required to be on an order of microseconds, and operating voltages of the cathodes may reach thousands of volts. For such a distributed X-ray source, there is a need for a high-voltage power supply with multiple switchable output channels (an output voltage of each of the channels may be flexibly and quickly adjusted) in which channel switching and voltage adjustment may be completed within a period of time on an order of microseconds, so as to realize flexible control of the multiple cathodes of the distributed X-ray source.

In a well-known method for implementing a multi-output high-voltage power supply, a high-voltage output of a negative high-voltage direct current power supply is used as a bus, and a respective Metal Oxide Semiconductor Field Effect Transistor (MOSFET) is connected in series from the high-voltage bus to each of output channels. If a MOSFET for a certain channel operates in a cutoff region, the channel does not output a high voltage; and if a MOSFET for a certain channel operates in a linear region, the channel outputs a high voltage.

The disadvantage of the above-mentioned method for implementing a multi-output high-voltage power supply is that if the MOSFET operates in the linear region, the MOSFET may generate a large amount of heat. If heat dissipation is poor, the MOSFET may be damaged due to overheating. Moreover, each channel may not be maintained in an operating state continuously for a long time or with a high duty cycle under certain ON-current (of usually 100 milliamps).

SUMMARY

In view of this, the present disclosure aims to provide a multi-output high-voltage power supply to achieve fast switching of high-voltage output between different channels and flexible and fast adjustment of an output voltage within a few microseconds, while preventing MOSFET switches from operating in a linear region, thereby reducing heat generated by the circuit, increasing reliability, extending life, and reducing costs.

According to an aspect of the present disclosure, there is provided a multi-output high-voltage power supply, comprising:

a channel selection circuit (103) comprising a plurality of switches; and a high-voltage power supply module (101) comprising a fine adjusting power supply component (110) and a plurality of coarse adjusting power supply components (120-1 to 120-N) connected in series, wherein one high-voltage output terminal of the high-voltage power supply module (101) is connected to a common terminal of the channel selection circuit (103), and the other high-voltage output terminal of the high-voltage power supply module (101) is grounded through a current sampling resistor. The output voltage of the high-voltage power supply module may be adjusted within a period of time on an order of microseconds. The channel selection switches in the channel selection circuit operate in a switching state, which avoids the problem of heat generation associated with operating in a linear region.

In an embodiment, each of the plurality of coarse adjusting power supply components (120-1 to 120-N) comprises a direct current-isolated power supply module, an output control switch, and a bypass diode, wherein an output positive electrode of the direct current-isolated power supply module is connected to a cathode of the bypass diode, and an output negative electrode of the direct current-isolated power supply module is connected in series to the output control switch and then to an anode of the bypass diode. If the output control switch is turned on, the bypass diode is turned off, and the output voltage of the power supply component is connected to the output terminal of the high-voltage power supply module; and if the output control switch is turned off, the output voltage of the power supply component is not connected to the output terminal of the high-voltage power supply module. If outputs of N power supply components are connected in series, a power supply having a maximum voltage which is N times the voltage of the power supply component may be implemented. Adjustment accuracy of the output voltage of the high-voltage power supply module is the output voltage of the power supply component, and an adjustment speed of the output voltage of the high-voltage power supply module is a switching speed of the output control switch.

In an embodiment, the fine adjusting power supply component (110) comprises a direct current-isolated power supply module (1101), a voltage reference supplying module (1102), a power amplifier (1103), an output control switch (1104) and a bypass diode (1105), wherein an output positive electrode and an output negative electrode of the direct current-isolated power supply module (1101) are connected to a power positive electrode and a power negative electrode of the power amplifier (1103) respectively, and the direct current-isolated power supply module (1101) is configured to supply power to the power amplifier (1103), the voltage reference supplying module (1102) is connected to a signal input terminal of the power amplifier (1103), an output terminal of the power amplifier (1103) is connected to a cathode of the bypass diode (1105), and the power negative electrode of the power amplifier (1103) is connected in series to the output control switch (1104) and then to an anode of the bypass diode (1105).

In an embodiment, the output control switches of the plurality of coarse adjusting power supply components (120-1 to 120-N) are controlled by a control circuit (102).

In an embodiment, the output control switch (1104) of the fine adjusting power supply component (110) is controlled by the control circuit (102), and a voltage reference supplied by the voltage reference supplying module (1102) of the fine adjusting power supply component (110) is set by the control circuit (102).

In an embodiment, an anode of the bypass diode (1105) of the fine adjusting power supply component (110) is connected to a cathode of a bypass diode (1203-1) of a first one (120-1) of the plurality of coarse adjusting power supply components (120-1 to 120-N), and an anode of a bypass diode of each of the plurality of coarse adjusting power supply modules (120-1 to 120-N), except for a last one (120-N) of the plurality of coarse adjusting power supply modules (120-1 to 120-N), is connected to a cathode of a next coarse adjusting power supply component, wherein a cathode of the bypass diode (1105) of the fine adjusting power supply component (110) is an output positive electrode of the high-voltage power supply module (101), and an anode of a bypass diode (1203-N) of the last coarse adjusting power supply component (120-N) is an output negative electrode of the high-voltage power supply module (101).

In an embodiment, positive voltage input terminals of direct current power supply isolation modules in the fine adjusting power supply component (110) and the plurality of coarse adjusting power supply components (120-1 to 120-N) are connected in parallel, and negative voltage input terminals of the direct current power supply isolation modules in the fine adjusting power supply component (110) and the plurality of coarse adjusting power supply components (120-1 to 120-N) are connected in parallel.

In an embodiment, the plurality of switches in the channel selection circuit (103) comprise a discharging switch (1030) and M channel selection switches, a terminal of the discharging switch and a terminal of each of the channel selection switches are connected together as a common terminal of the channel selection circuit (103), and the discharging switch and the channel selection switches are controlled by the control circuit (102). When no output channel is selected (i.e., gated), all the channel selection switches are in an OFF state, the discharging switch is in an ON state, and a residual voltage at a high-voltage output terminal of the high-voltage power supply module may be released; and when one output channel is selected, a corresponding channel selection switch is in an ON state, while remaining channel selection switches and the discharging switch are in an OFF state.

In an embodiment, if the output negative electrode of the high-voltage power supply module (101) is grounded through the current sampling resistor (104) and the output positive electrode of the high-voltage power supply module (101) is connected to the common terminal of the channel selection circuit (103), a high positive voltage is output by the multi-output high-voltage power supply; and if the output positive electrode of the high-voltage power supply module (101) is grounded through the current sampling resistor (104) and the output negative electrode of the high-voltage power supply module (101) is connected to the common terminal of the channel selection circuit (103), a high negative voltage is output by the multi-output high-voltage power supply.

In an embodiment, an analog signal on the current sampling resistor (104) is converted into a digital signal by an analog-to-digital conversion circuit (105), and the digital signal is output to the control circuit (102) as a current feedback signal of the multi-output high-voltage power supply.

In an embodiment, the multi-output high-voltage power supply is calibrated before it operates normally. An output control switch of each of the components and the channel selection switches in an initial state are all in an OFF state. Firstly, a required output channel is gated by the control circuit, then an output control switch of the power supply component and a voltage reference of the fine adjusting power supply component are controlled, so as to gradually increase an output voltage of the high-voltage power supply module while reading an output current value. In this way, a volt-ampere characteristic curve for an output channel may be obtained. Then, the channel may be turned off, so as to calibrate a next channel. After all the channels are calibrated, a voltage value corresponding to operating current in a normal state may be obtained according to the calibrated volt-ampere characteristic curve.

According to another aspect of the present disclosure, there is provided a distributed ray source comprising the multi-output high-voltage power supply described above.

BRIEF DESCRIPTION OF THE DRAWINGS

The above and other purposes, features, and advantages of the present disclosure will become more apparent from the following description of embodiments of the present disclosure with reference to the accompanying drawings, in which.

LIST OF REFERENCE SIGNS

Figure 1:
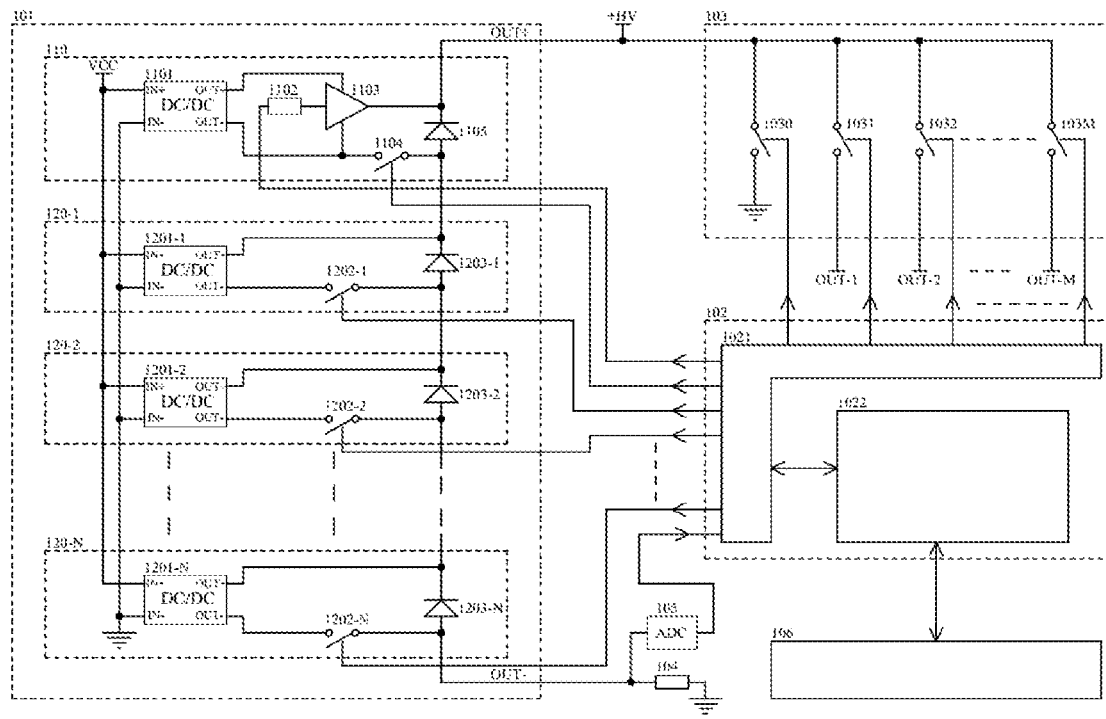
FIG. 1 illustrates a schematic structural diagram of a multi-output high-voltage power supply which outputs a positive voltage according to an embodiment of the present disclosure.

101 High-voltage power supply module
102 Control circuit
103 Channel selection circuit
104 Current sampling resistor
105 Analog-to-Digital Converter (ADC)
106 Host computer
110 Fine adjusting power supply component
120-1, 120-2, 120-N Coarse adjusting power supply component
1101, 1201-1, 1201-2, 1201-N direct current-isolated power supply module
1102 Voltage reference supplying module
1103 Power amplifier
1104, 1202-1, 1202-2, 1202-N Output control switch
1105, 1203-1, 1203-2, 1203-N Bypass diode
1021 Underlying control circuit
1022 Data processing circuit
1030 Discharging switch
1031, 1032, 103M Channel selection switch

DETAILED DESCRIPTION

Hereinafter, the embodiments of the present disclosure will be described with reference to the accompanying drawings. It should be understood, however, that these descriptions are merely exemplary and are not intended to limit the scope of the present disclosure. In addition, in the following illustration, descriptions of well-known structures and techniques are omitted so as to avoid unnecessarily obscuring the concepts of the present disclosure.

The terminology used herein is for the purpose of describing specific embodiments only and is not intended to limit the present disclosure. The words "a", "an", "the" etc. used herein shall also include the meanings of "a plurality of" and "multiple", unless the context clearly indicates otherwise. Furthermore, the terms "including", "comprising", etc. as used herein indicate the presence of features, steps, operations, and/or components, but do not preclude the presence or addition of one or more other features, steps, operations, or components.

All terms (including technical and scientific terms) as used herein have the meaning commonly understood by those skilled in the art unless otherwise defined. It should be illustrated that the terms as used herein should be interpreted to have meanings consistent with the context of the specification, and should not be interpreted in an idealized or overly rigid manner.

Figure 2:
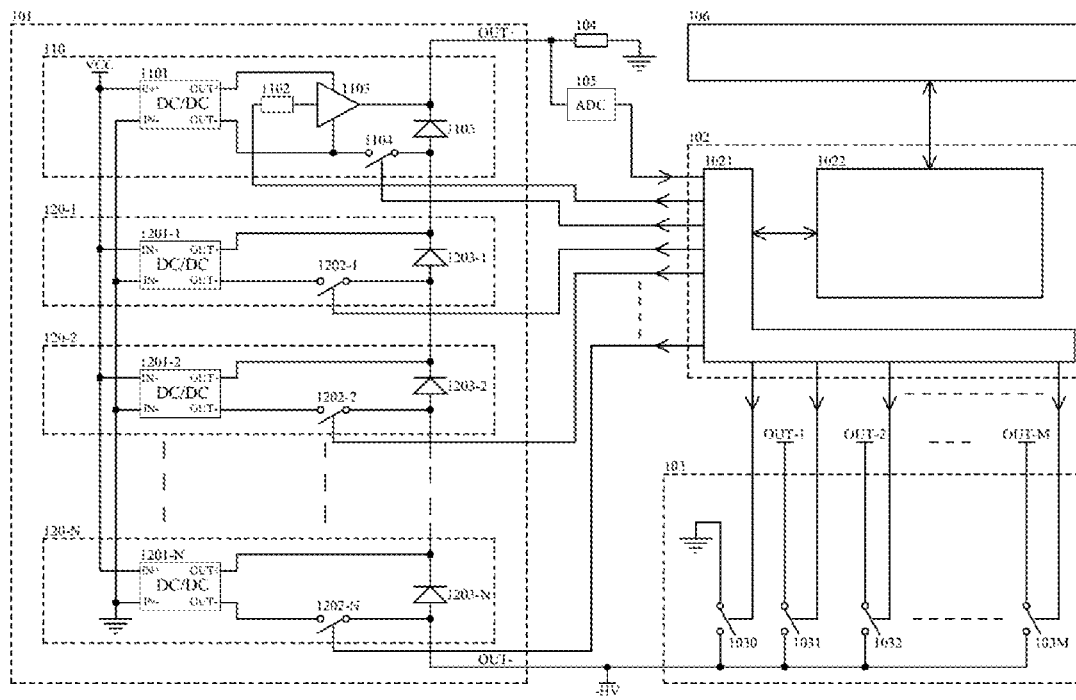
FIG. 2 illustrates a schematic structural diagram of a multi-output high-voltage power supply which outputs a negative voltage according to an embodiment of the present disclosure.

FIGS. 1 and 2 illustrate schematic structural diagrams of a multi-output high-voltage power supply according to an embodiment of the present disclosure. The multi-output high-voltage power supply illustrated in FIG. 1 may output multiple high positive voltages, and the multi-output high-voltage power supply illustrated in FIG. 2 may output multiple high negative voltages. The multi-output high-voltage power supply may comprise a high-voltage power supply module 101 which generates a high direct current voltage, a control circuit 102, a channel selection circuit 103, a current sampling resistor 104, an analog-to-digital conversion circuit 105, and a host computer 106. If an output negative electrode of the high-voltage power supply module is grounded through the current sampling resistor 104, and an output positive electrode of the high-voltage power supply module is connected to a common terminal of the channel selection circuit 103, the multi-output high-voltage power supply may output a high positive voltage; and if the output positive electrode of the high-voltage power supply module is grounded through the current sampling resistor 104, and the output negative electrode of the high-voltage power supply module is connected to the common terminal of the channel selection circuit 103, the multi-output high-voltage power supply module may output a high negative voltage.

The high-voltage power supply module 101 is formed by one fine adjusting power supply module 110 and N coarse adjusting power supply modules 120-1 to 120-N having the same structure, which are connected in series. An output positive electrode of the fine adjusting power supply module 110 which is connected in series is the output positive electrode of the high-voltage power supply module 101. An output negative electrode N of a last coarse adjusting power supply component 120-N which is connected in series is the output negative electrode of the high-voltage power supply module.

Each coarse adjusting power supply component 120-$i$ (i=1, N) of the N coarse adjusting power supply components 120-1 to 120-N comprises a direct current-isolated power supply module 1201-$i$ (i=1, N), a switch 1202-$i$ (i=1, N) and a diode 1203-$i$ (i=1, N). The direct current-isolated power supply module 1201-$i$ is used to provide an isolated output voltage. The switch 1202-$i$ is connected to a negative electrode of the direct current-isolated power supply module 1201-$i$, an anode of the diode 1203-$i$ is connected to the switch 1202-$i$, and a cathode of the diode 1203-$i$ is connected to a positive electrode of the direct current-isolated power supply module 1201-$i$. The cathode of the diode 1203-$i$ is used as an output positive electrode of the coarse adjusting power supply component 120-$i$, and the anode of the diode 1203-$i$ is used as an output negative electrode of the coarse adjusting power supply component 120-$i$. Each of the switches 1202-$i$ may be independently controlled and quickly switched. When the switch 1202-$i$ is turned on, the diode 1203-$i$ is turned off, an output voltage of the coarse adjusting power supply component 120-$i$ is the isolated output voltage of the direct current-isolated power supply module 1201-$i$, and the output voltage of the coarse adjusting power supply component 1201-$i$ is connected in series to an output terminal of the high-voltage power supply module 101; and when the switch 1202-$i$ is turned off, the diode 1203-$i$ is turned on, the output voltage of the coarse adjusting power supply component 120-$i$ is bypassed by the diode 1203-$i$, and an output voltage of the high-voltage power supply module 101 is obtained by subtracting an on-voltage of the bypass diode 1203-$i$ from an output voltage of other coarse adjusting power supply components. If the switches of the N coarse adjusting power supply components are all turned on, the highest output voltage of the high-voltage power supply module 101 is N times the output voltage of the coarse adjusting power supply component 120-$i$. In this case, maximum adjustment accuracy of the output voltage of the high-voltage power supply module 101 is the output voltage of the single coarse adjusting power supply component 120-$i$, that is, the isolated output voltage of the direct current-isolated power supply module 1201-$i$.

An anode of the diode 1203-N in the last coarse adjusting power supply component 120-N of the N coarse adjusting power supply components 120-1 to 120-N is the output negative electrode of the high-voltage power supply module. In addition, an anode of a diode 1203-$i$ in each of the N coarse adjusting power supply components 120-1 to 120-N except for the last coarse adjusting power supply component 120-N may be connected to a cathode of a diode 1203-$i$+1 in a next coarse adjusting power supply component.

The switches 1202-1 to 1202-N may be high-speed isolation switches. Each of the high-speed isolation switches may comprise high-speed isolation devices (such as magnetically coupled or capacitively coupled devices) and low-power high-speed MOSFETs. Operating frequencies of certain models of high-speed isolation devices and high-speed MOSFETs may reach tens of MHz. A voltage adjustment speed of the high-voltage power supply module 101 is a switching speed of the high-speed isolation switches, and therefore voltage adjustment of the high-speed power supply module 101 may be completed within a period of time on an order of microseconds.

The fine adjusting power supply component 110 is used to improve voltage adjustment accuracy of the high-voltage power supply module 101. The fine adjusting power supply component 110 comprises a direct current-isolated power supply module 1101, a voltage reference supplying module 1102, a power amplifier 1103, a switch 1104, and a diode 1105. A positive electrode and a negative electrode of the direct current-isolated power supply module 1101 are connected to a positive power terminal and a negative power terminal of the power amplifier 1103 respectively, and the direct current-isolated power supply module 1101 is used to supply power to the power amplifier 1103. The voltage reference supplying module 1102 may be a digital potentiometer or a Digital-to-Analog Converter (DAC). An output terminal of the voltage reference supplying module 1102 is connected to a signal input terminal of the power amplifier

1103. The power amplifier 1103 is used to perform power amplification on a received input signal. The switch 1104 is connected to the negative electrode of the direct current-isolated power supply module 1101 and the negative power terminal of the power amplifier 1103. An anode of the diode 1105 is connected to the switch 1104, and a cathode of the diode 1105 is connected to an output terminal of the power amplifier 1103. The cathode of the diode 1105 is used as an output positive electrode of the fine adjusting power supply component 110, and the anode of the diode 1105 is used as an output negative electrode of the fine adjusting power supply component 110. The highest output voltage of the fine adjusting power component is the highest output voltage of the power amplifier 1103, that is, an isolated output voltage of the direct current-isolated power supply module 1101. If the voltage reference supplying module is an 8-bit DAC, theoretically, the adjustment accuracy of the fine adjusting power supply component 110 may be improved to 1/255 of the isolated output voltage of the direct current-isolated power supply module 1101. If the switch 1104 is turned on, the output voltage of the power amplifier 1103 is connected to the output terminal of the high-voltage power supply module 101 in series, and therefore the adjustment accuracy of the output voltage of the high-voltage power supply module 101 is improved to the adjustment accuracy of the output voltage of the fine adjusting power supply component 110.

The anode of the diode 1105 in the fine adjusting power supply component 110 is connected to a cathode of a diode 1203-1 in a first coarse adjusting power supply component 120-1 of the N coarse adjusting power supply components 120-1 to 120-N, and the cathode of the diode 1105 in the fine adjusting power supply component 110 is the output positive electrode of the high-voltage power supply module.

The current sampling resistor 104 is connected in series between an output terminal of the high-voltage power supply module 101 and the ground. When the multi-output high-voltage power supply operates, a signal representing output current may be generated on the current sampling resistor. A waveform of the current may be viewed through an oscilloscope. The analog-to-digital converter 105 performs Analog-to-Digital (AD) conversion on the signal to obtain amplitude of the output current.

The channel selection circuit 103 comprises one discharging switch 1030 and M channel selection switches (1031 to 103M). If no channel is selected, all the channel selection switches are in a turn-off state, and the discharging switch is in an ON state, so that a residual voltage at the high-voltage output terminal of the high-voltage power supply module may be released through the discharging switch; and if the discharging switch is turned off, and a channel selection switch 103j is turned on, a channel corresponding to the channel selection switch 103j is selected, and a high voltage output from the high-voltage power supply module is output to the output terminal through the switch 103j.

In order to reduce cost and volume, single-transistor high-voltage MOSFETs are selected to be used as the discharging switch and the channel selection switches 1030 to 103M of the channel selection circuit 103. The high-voltage MOSFETs are in a switching operating state. If a certain MOSFET is turned off, a corresponding channel may not output a high voltage, and there is no high voltage across a load connected to the channel; and if a certain MOSFET is saturated (turned on), a corresponding channel may output a high voltage and there may be a high voltage across a load connected to the channel. A very small amount of heat may be generated by the MOSFET when it is in the switching operating state, and there is almost no need to consider a heat dissipation problem. Some models of high-voltage MOSFETs have a switching time up to a few hundred nanoseconds, and therefore the channel switching may be completed within a period of time on an order of microseconds.

Logic and timing control of the output control switches of the high-voltage power supply module as well as the discharging switch and the channel selection switches of the channel selection circuit may be performed by the control circuit 102. At the same time, a digital signal which is obtained by performing AD conversion on an analog signal on the current sampling resistor is also input to the control circuit to be used as a current feedback signal of the multi-output high-voltage power supply. The control circuit may further set a voltage reference for the fine adjusting power supply component.

The control circuit 102 comprises an underlying control circuit 1021 and a data processing circuit 1022. The underlying control circuit 1021 is used for timing control and switching logic. A FPGA or CPLD is selected to implement functions of the underlying control circuit. The data processing circuit 1022 is used for data processing and communication between the underlying control circuit and the host computer 106. An ARM is selected to implement functions of the data processing circuit. Functions of the control circuit may also be implemented by a System On Chip (SOC).

The host computer 106 provides a Graphical User Interface (GUI), which may be used to transmit control commands and configuration parameters to the control circuit and display an operating state and operating parameters.

Before the multi-output high-voltage power supply operates normally, the multi-output high-voltage power supply needs to be firstly calibrated to determine a voltage corresponding to operating current of a load of each of the channels. The calibration process may be performed as follows: turning off the discharging switch 1030; turning on a switch 103j to gate one of the channels; then turning on a first switch (for example, the switch 1202-1) in the high-voltage power supply module 101; gradually increasing an output of the voltage reference supplying module 1102 from 0 while detecting whether current on the current sampling resistor 104 reaches operating current of a load of the gated channel, and if the current does not reach the operating current when the output of the voltage reference supplying module 1102 reaches a maximum value, decreasing the output of the voltage reference supplying module 1102 to 0, then turning on a second switch (for example, a switch 1202-2) in the high-voltage power supply module 101, gradually increasing the output of the voltage reference supplying module 1102, and repeating the above process, and so on, until current on the current sampling resistor 104 reaches operating current a load of the gated channel. A voltage at the time when the current reaches the operating current is an operating voltage of the load of the channel. After the calibration of all the channels is completed, the multi-output high-voltage power supply may operate normally.

If a high voltage is required to be output by a $j^{th}$ channel of the multi-output high-voltage power supply, it may be implemented by turning off the discharging switch 1030, turning on a $j^{th}$ channel selection switch 103j, then controlling a combination of the output control switches of the respective power components of the high-voltage power supply module 101, and adjusting the output of the voltage reference supplying module 1102 of the fine adjusting power supply component, so that a suitable voltage is output by the high-voltage power supply module. In this way, the required output voltage may be obtained by a $j^{th}$ output terminal of the multi-output high-voltage power supply. After an operation of the $j^{th}$ channel is completed, the output control switches of the respective power supply components of the high-voltage power supply module are firstly turned off. Then, the channel selection switch 103j is turned off. Finally, the discharging switch 1030 is turned on, so as to release a residual voltage of the high-voltage power supply module. This control manner makes the channel selection switch 103j be in an ON/OFF state without current flowing therethrough, thereby minimizing heat generated by the channel selection switch 103j.

In another embodiment, the present disclosure further provides a distributed ray source comprising the multi-output high-voltage power supply described above.

Compared with the related art, in the technology used in the present disclosure, the heat dissipation problem is not a relatively series problem to take into account since the high-voltage MOSFETs which control the operation of the cathodes are in a switching state. Therefore, the multi-output high-voltage power supply based on the direct current isolated power supply module has the advantages of high output voltage adjustment speed, high precision, simple structure, low heat generation, small size, high reliability, low cost, etc.

Various embodiments of the multi-output high-voltage power supply based on a direct current-isolated power supply module and the distributed ray source with a multi-output high-voltage power supply have been described in detail above with reference to illustration, flowcharts, and/or examples. In a case that such illustration, flowcharts and/or examples include one or more functions and/or operations, it will be understood by those skilled in the art that each of the functions and/or operations in such illustrations, flowcharts, or examples may be individually and/or collectively implemented in a variety of structures, hardware, software, firmware, or substantially any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

We claim:

1. A multi-output high-voltage power supply, comprising:
   a channel selection circuit comprising a plurality of switches; and
   a high-voltage power supply module comprising a fine adjusting power supply component and a plurality of coarse adjusting power supply components connected in series, wherein one high-voltage output terminal of the high-voltage power supply module is connected to a common terminal of the channel selection circuit, and the other high-voltage output terminal of the high-voltage power supply module is grounded through a current sampling resistor.

2. The multi-output high-voltage power supply of claim 1, wherein each of the plurality of coarse adjusting power supply components comprises a direct current-isolated power supply module, an output control switch, and a bypass diode, wherein an output positive electrode of the direct current-isolated power supply module is connected to a cathode of the bypass diode, and an output negative electrode of the direct current-isolated power supply module is connected in series to the output control switch and then to an anode of the bypass diode.

3. The multi-output high-voltage power supply of claim 2, wherein the fine adjusting power supply component comprises a direct current-isolated power supply module, a voltage reference supplying module, a power amplifier, an output control switch and a bypass diode, wherein an output positive electrode and an output negative electrode of the direct current-isolated power supply module are connected to a power positive electrode and a power negative electrode of the power amplifier respectively, and the direct current-isolated power supply module is configured to supply power to the power amplifier, the voltage reference supplying module is connected to a signal input terminal of the power amplifier, an output terminal of the power amplifier is connected to a cathode of the bypass diode of the fine adjusting power supply component, and the power negative electrode of the power amplifier is connected in series to the output control switch and then to an anode of the bypass diode of the fine adjusting power supply component.

4. The multi-output high-voltage power supply of claim 3, wherein an anode of the bypass diode of the fine adjusting power supply component is connected to a cathode of a bypass diode of a first one of the plurality of coarse adjusting power supply components, and an anode of a bypass diode of each of the plurality of coarse adjusting power supply modules, except for a last one of the plurality of coarse adjusting power supply modules, is connected to a cathode of a next coarse adjusting power supply component, wherein the cathode of the bypass diode of the fine adjusting power supply component is an output positive electrode of the high-voltage power supply module, and an anode of a bypass diode of the last coarse adjusting power supply component is an output negative electrode of the high-voltage power supply module.

5. The multi-output high-voltage power supply of claim 4, wherein if the output negative electrode of the high-voltage power supply module is grounded through the current sampling resistor and the output positive electrode of the high-voltage power supply module is connected to the common terminal of the channel selection circuit, a high positive voltage is output by the multi-output high-voltage power supply; and if the output positive electrode of the high-voltage power supply module is grounded through the current sampling resistor and the output negative electrode of the high-voltage power supply module is connected to the common terminal of the channel selection circuit, a high negative voltage is output by the multi-output high-voltage power supply.

6. The multi-output high-voltage power supply of claim 2, wherein the output control switches of the plurality of coarse adjusting power supply components are controlled by a control circuit.

7. The multi-output high-voltage power supply of claim 6, wherein the output control switch of the fine adjusting power supply component is controlled by the control circuit, and a voltage reference supplied by the voltage reference supplying module of the fine adjusting power supply component is set by the control circuit.

8. The multi-output high-voltage power supply of claim 6, wherein the plurality of switches in the channel selection circuit comprise a discharging switch and M channel selection switches, a terminal of the discharging switch and a terminal of each of the channel selection switches are connected together as the common terminal of the channel selection circuit, and the discharging switch and the channel selection switches are controlled by the control circuit.

9. The multi-output high-voltage power supply of claim 6, wherein an analog signal on the current sampling resistor is converted into a digital signal by an analog-to-digital conversion circuit, and the digital signal is output to the control circuit as a current feedback signal of the multi-output high-voltage power supply.

10. The multi-output high-voltage power supply of claim 1, wherein positive voltage input terminals of direct current power supply isolation modules in the fine adjusting power supply component and the plurality of coarse adjusting power supply components are connected in parallel, and negative voltage input terminals of the direct current power supply isolation modules in the fine adjusting power supply component and the plurality of coarse adjusting power supply components are connected in parallel.

11. A distributed ray source comprising the multi-output high-voltage power supply according to claim 1.

* * * * *